Patented Dec. 21, 1937

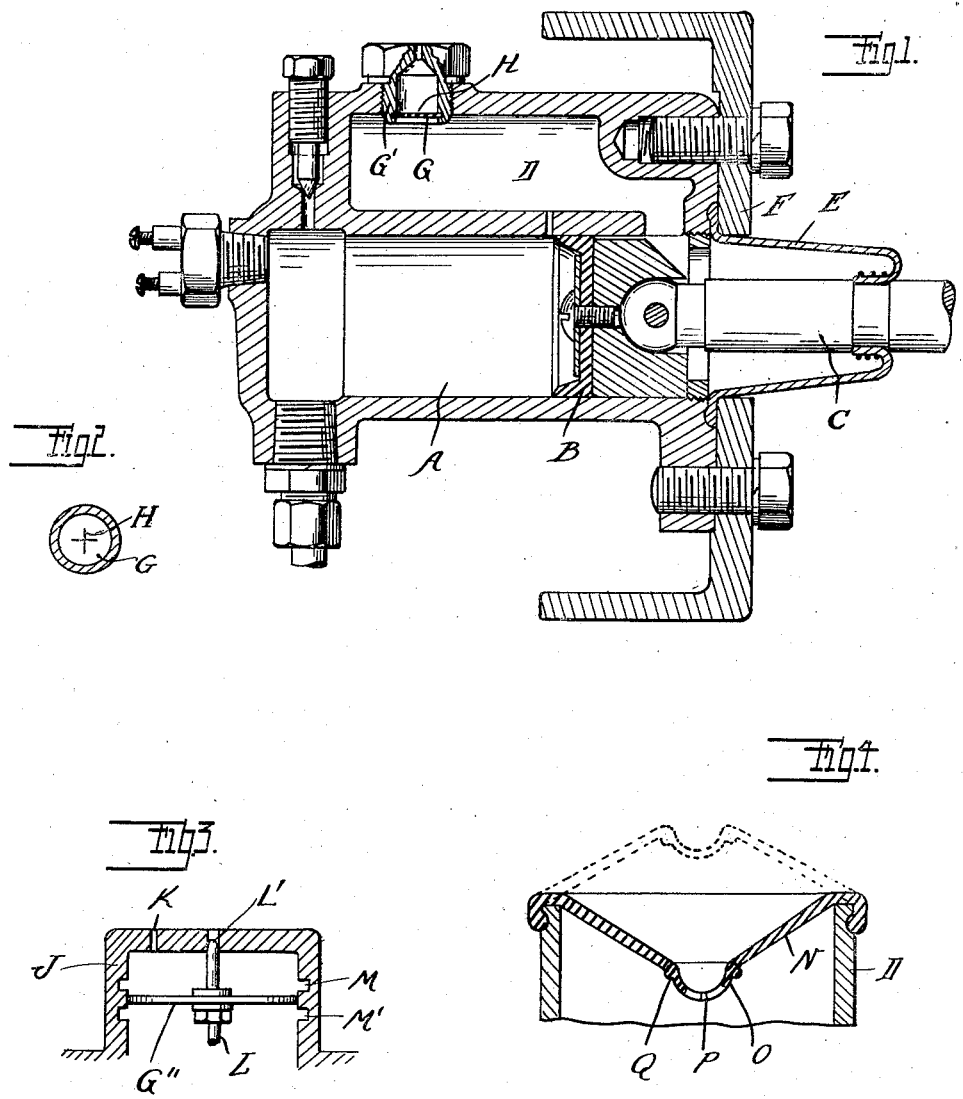

2,102,824

UNITED STATES PATENT OFFICE 2,102,824

BREATHING SEAL

John William White, Detroit, Mich., assignor, by mesne assignments, to Bendix Products Corporation, a corporation of Indiana Application February 15, 1932, Serial No. 593,149

1 Claim. (Cl. 251—119)

The invention relates to breather valves, being more particularly designed for use in connection with hydraulic brake systems and forming a continuation in part of my former application for patent Serial No. 317,933, filed November 8, 1928, which has matured into Patent No. 2,030,340. It is the object of the invention to obtain a construction in which the breather normally hermetically seals a fluid containing chamber so as to prevent communication between the atmosphere within and that without said chamber, but which nevertheless permits atmospheric exchange under certain conditions. Thus in case the fluid within the chamber contains volatile elements or elements which are detrimentally effected by atmospheric contact, this breather valve will normally prevent ingress of air. Nevertheless, sufficient air will be permitted to enter the chamber to equal the volume of the fluid fed out therefrom into the brake system so as to maintain substantially constant atmospheric pressure. My invention therefore consists in the peculiar construction as hereinafter set forth.

In the drawing:

Figure 1 is a longitudinal section through the master cylinder of a hydraulic brake to which my improvement is applied;

Figure 2 is a plan view of the breathing sealing member;

Figure 3 is a sectional elevation showing a modified construction of the breathing sealing member, and Figure 4 is a section showing another modification.

As shown in Figure 1, A is the master cylinder of a hydraulic brake system containing a piston B which is actuated by a rod C. D is a reservoir or fluid supply receptacle for the cylinder A preferably formed integral therewith and preferably overlapping the end of the cylinder through which the rod C enters. This rod passes through an aligned opening in the casing D of sufficient area to admit the piston B, and to retain the fluid there is provided a flexible boot E, one end of which is clamped by a member F to the casing D and the other end being secured to the rod C. The arrangement is such that movement of the rod C and piston B is permitted by the flexing of the boot E and the construction is also preferably such that the fluid displacement by the boot E during movement of the rod C is substantially equal to the fluid displacement of the piston B so that the level of fluid within the casing D remains substantially constant.

As has been stated, it is desirable to hermetically seal the casing D, first, to prevent the escape of volatile constituents in the fluid therein and second, to prevent detrimental effect on the fluid by contact with the atmosphere, such as oxidation of certain of the ingredients. At the same time it is necessary to compensate for any slight inequalities in the displacement of the boot E and the piston B and to also permit of the gradual feeding of the fluid from the casing D into the cylinder A and the brake system connected therewith. This I accomplish by the use of sealing means which is effective when the internal and external atmospheric pressures are substantially equal but which will permit of the passage of air under certain conditions. As shown in Figure 1, this breather consists of a disk G of flexible rubber which is arranged across an opening in the casing D and is peripherally sealed against the walls thereof, as by engaging a groove in a threaded nipple G'. This disk is provided with a slit H, preferably a pair of cross slits, which, however, are normally sealed by the pressure of the rubber on opposite sides thereof so as to prevent any passage of air therethrough. If, however, the pressure on one side of the disk is greater than that on the opposite side, a lateral deflection of the disk caused by this differential pressure will open the slits so as to permit passage of air. This will quickly equalize the pressures whereupon the slits will again close to form a seal.

A modified construction is shown in Figure 3 in which J is a cylindrical portion of the housing D provided with a port opening K therein, G" is a disk which is centrally supported on a stem L secured to the casing in any suitable way as at L' with the periphery of the disk in sealing contact with the walls of the cylinder J. Adjacent to the disk on opposite sides thereof the walls of the cylinder J are grooved or cut away at M and M', the arrangement being such that when the disk is deflected in either direction it will break its sealing contact at the periphery and permit passage of air.

Another modification is shown in Figure 4. In this construction the flexible boot E may be omitted and other sealing means for the rod C substituted so that any movement of the piston B in the cylinder A will cause a displacement and change of level of the fluid in the casing D. To compensate for this a dome shaped flexible cap N is placed to cover an opening in the casing D, said cap being capable of moving inward and outward to compensate for fluid displacements within the casing in the ordinary movement of the piston B. Inasmuch, however, as the fluid is gradually fed from the housing D into the cylinder A and brake system, the amount of displacement would be in excess of the capacity of the cap N for taking care of it. I have therefore provided means permitting passage of air under certain conditions consisting of an inwardly extending portion O of the center of the cap, centrally slitted at P and surrounded by a portion Q of harder rubber. This construction will permit the ordinary flexing of the cap to compensate for piston displacement but in case the fluid level within the casing D drops below a certain point and the cap N has reached the limit of its inward movement, the portion O will flex, opening the slit P and permitting the entrance of air into the chamber.

With all of the several modifications shown, as well as with others which might be made, passage of air is normally prevented but when the pressure on one side exceeds that on the other, sufficient air will be permitted to pass to bring about an equalization of pressures.

What I claim as my invention is:

The combination with a casing having an opening therein with cylindrical walls and with spaced annular grooves in said walls, of a flexible resilient disk extending across said casing, means for centrally supporting said disk with its peripheral edge in sealing contact with said cylindrical wall intermediate the grooves therein in the normal position of the disk whereby a deflection of said disk in either direction will break the peripheral seal.

JOHN WILLIAM WHITE